Figure 1:
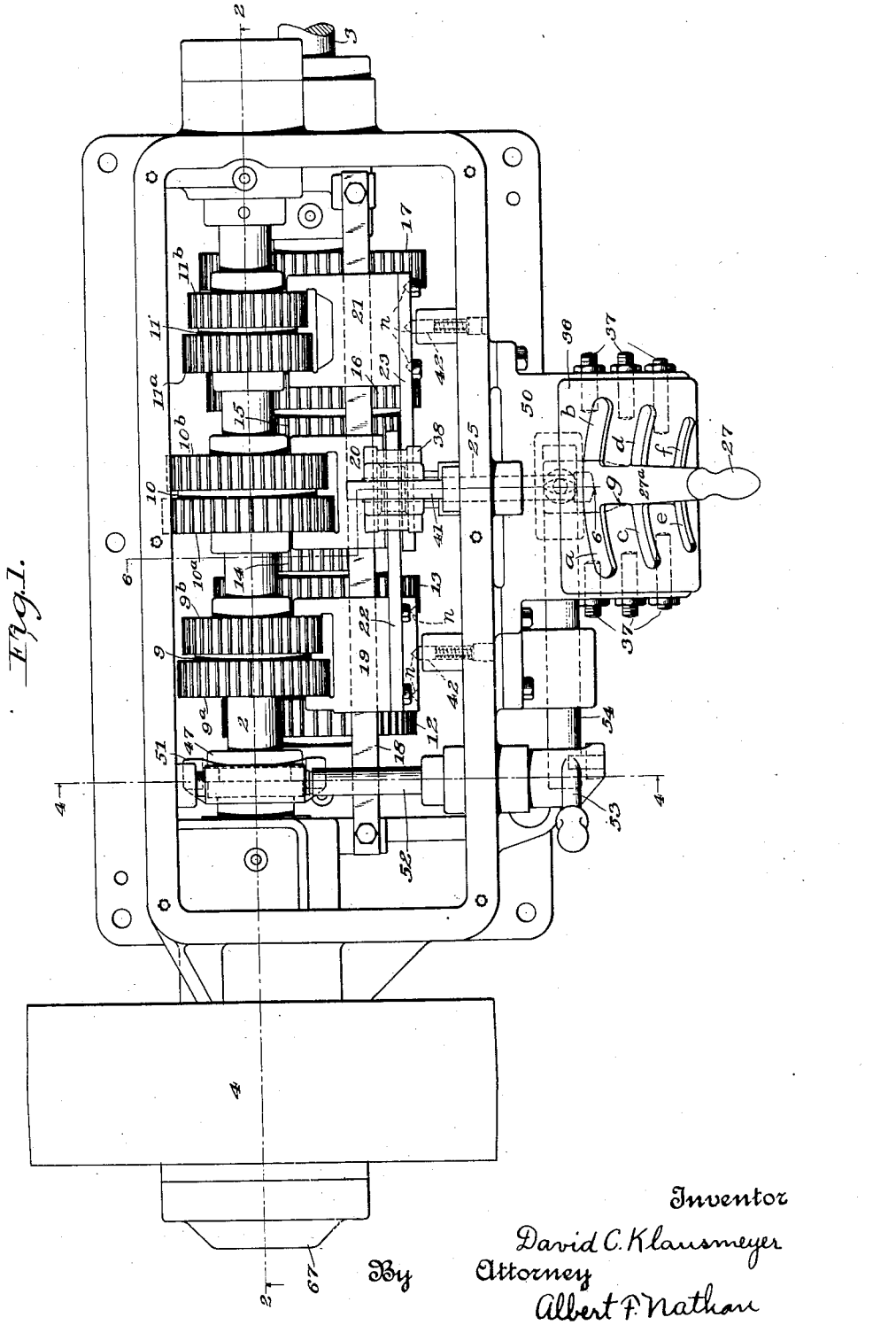

April 17, 1928.

D. C. KLAUSMEYER 1,666,422

MASTER RADIAL DRILL SPEED BOX

Filed Feb. 10, 1925 4 Sheets-Sheet 1

Inventor
David C. Klausmeyer
By Attorney
Albert F. Nathan

April 17, 1928.

D. C. KLAUSMEYER 1,666,422

MASTER RADIAL DRILL SPEED BOX

Filed Feb. 10, 1925 4 Sheets-Sheet 2

Inventor
David C. Klausmeyer
By Attorney
Albert F. Nathan

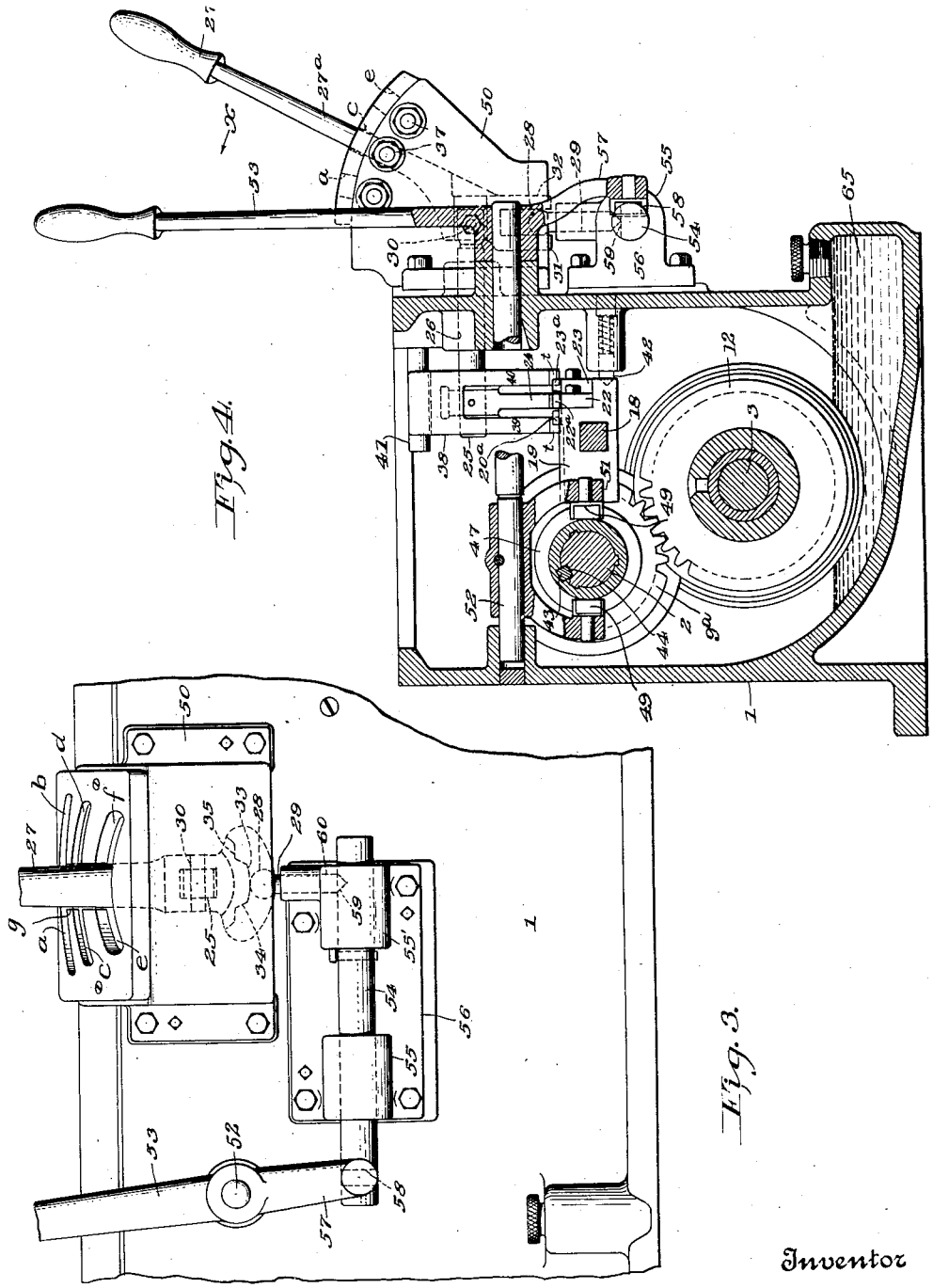

April 17, 1928.　　　　　　　　　　　　　　　　　　　1,666,422
D. C. KLAUSMEYER
MASTER RADIAL DRILL SPEED BOX
Filed Feb. 10, 1925　　　4 Sheets-Sheet 4

Inventor
David C. Klausmeyer
By Attorney
Albert F. Nathan

Patented Apr. 17, 1928.

1,666,422

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

MASTER RADIAL-DRILL SPEED BOX.

Application filed February 10, 1925. Serial No. 8,184.

This invention relates to speed-boxes, that is those devices used in connection with certain machine tools to provide a plurality of speed-changes between a prime-mover and a driven shaft from which power may be taken to operate various mechanisms of the machine tool. A radial drill is one type of machine tool employing this form of speed-change mechanism.

A speed-box for radial drills usually provides from six to eight speed-changes and these speed-changes are multiplied by four by certain back-gears carried by the drill-head, thus rendering available in the drill spindle from twenty-four to thirty-two different speeds.

This invention has for an object to provide an improved speed-box in which six speed changes selectively may be effected by the manipulation of a single gear shifting lever.

Another object is to provide a speed-box, of the sliding-gear type, embodying one lever to control a driving clutch and another lever to effect the speed changes and so to coordinate these levers that the driving clutch may be actuated only after the gears have been properly meshed and in which the gears may be meshed only when the clutch controlling lever is in its neutral position.

A further object of this invention is to provide a single-lever six speed gear-shift mechanism and to combine therewith means to regulate the throw of the lever to insure complete meshing of the driving and driven gears.

Still another object of the invention is to provide a speed-box including change-gear mechanism and a controlling clutch for the gear-mechanism and so to construct and arrange the parts that substantially all of the mechanism except the actuating levers may be housed within a closed casing.

These objects have been attained in a speed-box comprising a closed casing within which are journaled two shafts, one of which (hereinafter called the drive shaft) is adapted to be clutched to a prime-mover and the other of which acts as a power delivery shaft. The delivery shaft carries six gears of varying sizes which are adapted selectively to be engaged by the gears of three gear-units splined to the drive shaft. These gear-units are each engaged by a slidable gear-shifter provided with a toothed rack. The racks are arranged side by side and a single gear-segment, movable across the racks and also having a swinging movement lengthwise of the racks, serves selectively to engage and shift any one of the racks and thereby one of the gear-units to mesh one of its gears with one of the gears on the delivery shafts. The gear segment is carried by a shaft translatably and rotatably journaled in the casing, and a single lever, pivotally attached to the shaft serves to give the shaft both its rotative and its translative movements. A locking device carried adjacent the segment acts positively to lock the racks not engaged by the segment. To facilitate the selective meshing of the gears to produce the desired drive, the gear-shifting lever is arranged to be moved through the slots of an index plate providing six operative positions for the lever. An adjustable stop cooperates with each slot to limit the movement of the lever to insure complete meshing of the gears. An interlock between the clutch-actuating lever and the gear shifting lever acts to prevent shifting of the gears except when the driving clutch is ineffective, thus the clashing of gears is precluded.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
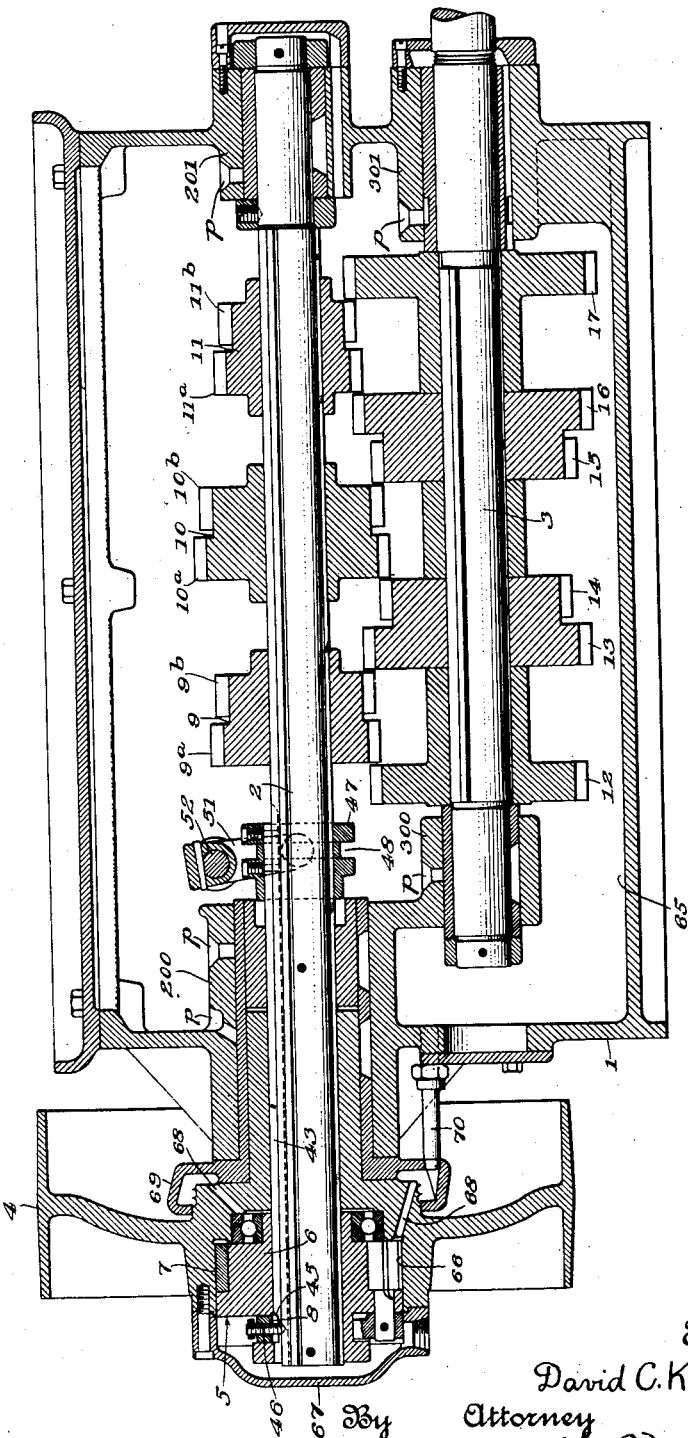
Figure 5:
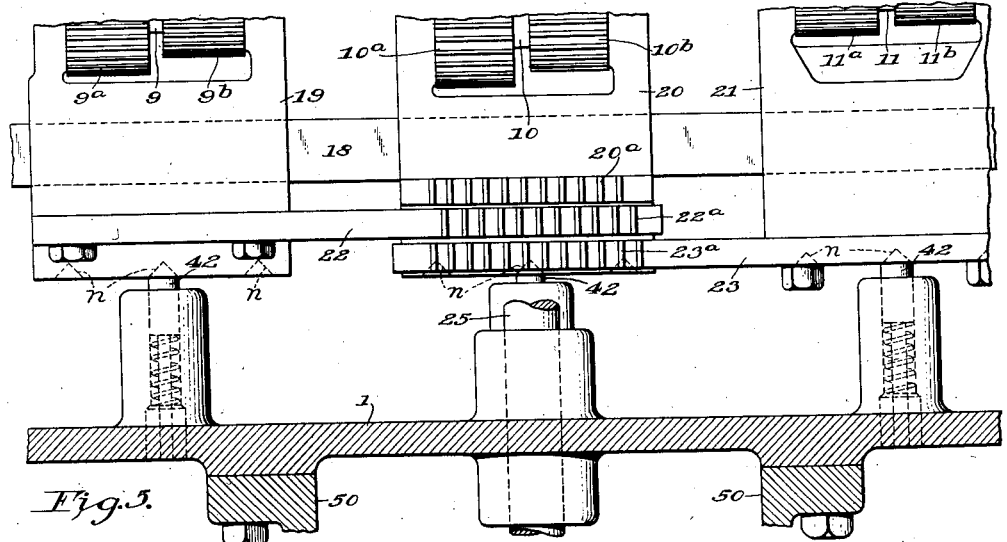
Figure 6:
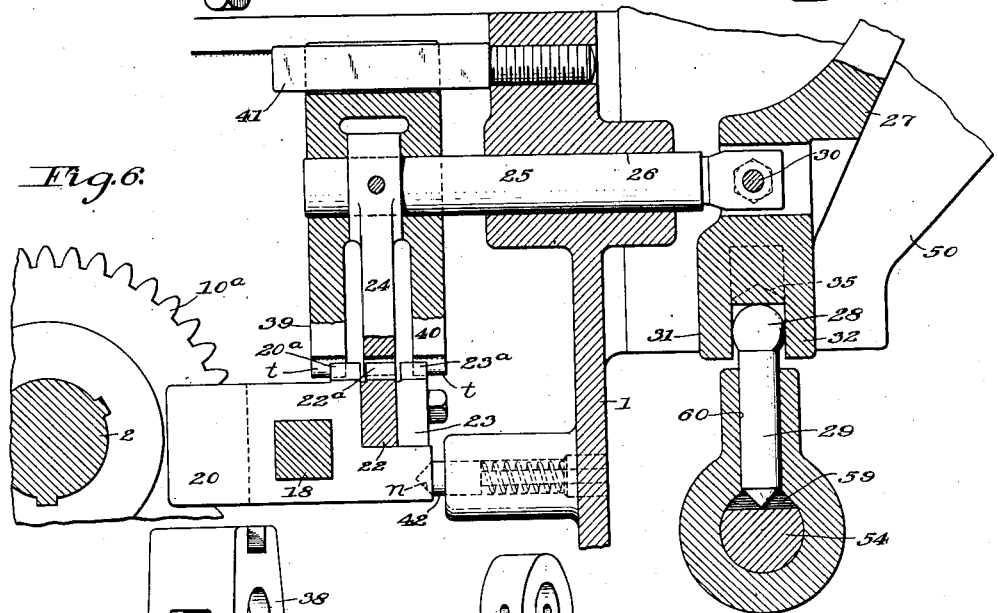
Figures 7, 8:
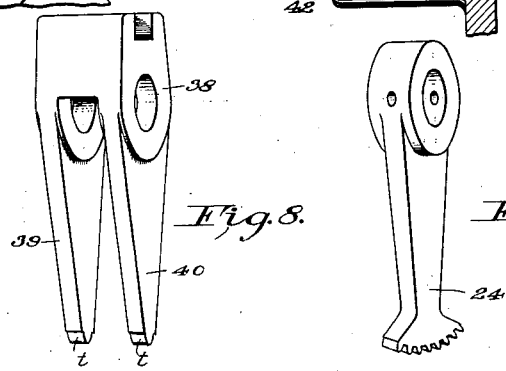

Fig. 1 is a plan of a speed-box embodying the present invention, the upper cover plate thereof being omitted better to disclose the parts therebeneath. Fig. 2 is a vertical section substantially on the line 2—2 of Fig. 1. Fig. 3 is a detail side elevation of a portion of the speed-box showing more particularly the interlock between the gear shifting lever and the clutch actuating lever, later to be referred to. Fig. 4 is a section on the line 4—4 of Fig. 1. Fig. 5 is a detail plan of a portion of Fig. 1 with the gear shifting segment and the locking device omitted. Fig. 6 is an enlarged section on the line 6—6 of Fig. 1. Fig. 7 is a perspective view of the gear-shifting segment and Fig. 8 is a perspective view of the rack locking yoke.

Referring more particularly to the drawings the invention is disclosed as embodied in a speed-box comprising a closed casing 1 within which are journaled a drive-shaft 2 and a delivery-shaft 3. Journaled coaxial with the shaft 2 is a pulley-wheel 4 adapted, upon actuation of a friction clutch 5, to transmit power to the drive-shaft 2. The clutch 5 is similar to that disclosed in United States patent to Schauer No. 756,185 dated March 29, 1904 and comprises a member 6 fixed to the shaft 2 and an expansible friction band 7 adapted upon the movement of a lever 8 to lock together the pulley 4 and the member 6.

Splined to the shaft 2 are gear-units 9, 10 and 11 providing gears $9^a$, $9^b$, $10^a$, $10^b$ and $11^a$, $11^b$ respectively. These gears are adapted to be meshed with and to drive gears 12, 13, 14, 15, 16 and 17 secured upon the delivery shaft 3. Fixed within the casing 1, parallel with the shafts 2 and 3, is a square shaft 18 upon which is slidingly fitted gear-shifters 19, 20 and 21 embracing the gear-units 9, 10 and 11 respectively.

To the gear shifters 19 and 21 are secured oppositely extending bars 22 and 23, respectively, having their free ends overlapping adjacent the gear-shifter 20 and provided with rack-teeth $22^a$ and $23^a$. The gear-shifter 20 also is formed with a rack $20^a$ adjacent the rack $22^a$. The racks $20^a$, $22^a$ and $23^a$ are arranged side by side in the same horizontal plane and are adapted selectively to be engaged by a gear-segment 24 fixed upon a shaft 25 rotatable and translatable in a bearing 26 provided by the casing 1. A single lever 27, fulcrumed upon a ball 28 constituting the upper end of a shiftable pin 29, is pivoted at 30 to one end of the shaft 25. The lower end of the lever 27 is formed with spaced arcuate plates 31 and 32 arranged in contact with the opposite sides of the ball 28 thus the fulcrum is maintained in all of the angular positions of the lever 27. Between the plates 31 and 32 is a circular segmental portion 33 provided with conical seats 34 and 35 adapted to receive the ball when the pin 29 has been thrust upwardly as later will be described. The lever 27 is adapted to be moved in two transverse directions, to six operative positions and to control and assist the lever in its various movements its shank $27^a$ passes through slots formed in index plate 36 supported by a bracket 50 secured to the casing 1. The plate 36 is formed with six slots, $a, b, c, d, e$ and $f$ and a communicating central slot $g$. Movement of the lever 27 through the central slot $g$ effects endwise movement of the shaft 25 and thereby lateral movement of the segment 24 across the racks $20^a$, $22^a$ and $23^a$. Referring to Fig. 4 it will be seen that when the lever is midway in the slot $g$ the gear-segment will be engaged with the rack $22^a$. It will readily be perceived that if the lever is moved in the direction of the arrow $x$ upon its fulcrum 28 the shaft 25 will be forced inward and the segment will be caused to engage the rack $20^a$. Likewise movement of the lever in the opposite direction will move the shaft outwardly and engage the segment with the rack $23^a$. Movement of the lever from the central slot into one of the transverse slots $a, b, c, d, e$ or $f$ will cause rotation of the shaft 25 which in turn will swing the segment and cause it to translate the gear-shifter with which it has been engaged. Stop screws 37 adjustably secured in the bracket 50 have their inner ends in the path of the lever 27 and serve to limit the movement of the lever in the transverse slots $a, b, c, d, e$ and $f$, thus insuring complete meshing of the driving and driven gears.

To prevent accidental movement of the gear shifters not engaged by the segment 24 there is preferably provided a positive locking device consisting of an inverted U-shaped yoke 38 mounted upon the shaft 25 and having depending legs 39 and 40 at opposite sides of the segment. These legs each terminate in a single tooth $t$ adapted to slide between the teeth of the racks $20^a$, $22^a$ and $23^a$. Inasmuch as the yoke is arranged at opposite sides of the segment it will readily be perceived that it will be caused to move laterally with the shaft 25 and segment 24 and that its teeth $t$ will lock the rack not engaged by the segment. The upper end of the yoke is bifurcated and engages a pin 41 supported by the casing 1, which prevents swinging of the yoke about the shaft 25. Spring detents 42 carried by the casing engage detent notches $n$ in the gear-shifters 19, 20 and 21 and serve to hold, against accidental movement, the gear-shifter not locked by the yoke 38.

The clutch 5, hereinbefore referred to, is adapted to be actuated by means of a bar 43 slidably mounted in a way 44 formed in the shaft 2. This bar is provided with a cam portion 45 which, upon movement of the bar in the way 44, engages a contact screw 46 carried by the clutch lever 8 and actuates the clutch. Actuation of the clutch is preferably effected by mechanism located mainly within the closed casing and comprising a collar 47 slidably mounted on the shaft 2 and secured to the bar 43. The collar 47 is formed with an annular groove 48 into which project blocks 49 carried by a yoke 51 fixed upon a shaft 52 journaled in the casing 1 transverse to the shaft 2. A lever 53 fixed to one end of the shaft 52, outside of the casing 1, affords means to oscillate the shaft, thereby to actuate the clutch 5.

As hereinbefore mentioned an interlock is provided between the clutch actuating lever 53 and the gear-shifting lever 27. This interlock comprises a rod 54, slidably mounted in bearings 55 and 55' provided by a bracket 56 secured to the side of the casing. The lever 53 has an extension 57, operatively connected, by means of a tongue and groove connection 58, with the rod 54. Within the bearing 55' the rod 54 is provided with a V-notch 59 adapted to receive the tapered end of the pin 29 slidable vertically in a bore 60 in the bearing 55'. It will be seen that, by virtue of the wedge shaped extremity of the pin 29 the rod 54 can freely translate when the pin is in the notch 59 only in case there is nothing to prevent the pin from freely moving longitudinally in the bore 60. Such longitudinal movement is prohibited under certain conditions by the segmental portion 33 of the lever 27. That is to say, it is only after the lever 27 has been moved to establish an appropriate meshing of the gears and either the notch 34 or 35 has been brought into alignment with the ball 28 that it is possible to shift the lever 53 to translate the rod 54 and connect the power with the gearing. The converse is also true that, after the lever 53 has been shifted to connect the power with the gearing and the rod 54 has raised the pin 29 into engagement with one of the notches 34 or 35, it becomes impossible to move the gear shifting lever and, if it is desired to change the gear ratio, the power lever 53 will have to be first restored to its inoperative position.

To provide means for continuously lubricating the gears and bearings, the casing 1 is preferably formed in its lower portion with a lubricant reservoir 65 from which lubricant is picked up by the gears on the shaft 3 and thrown about within the casing. The shafts 2 and 3 are journaled in bearings 200—201 and 300—301 respectively carried by the casing 1 and these bearings are formed in their upper sides with oil receiving apertures $p$ which receive a portion of the lubricant thrown off by the gears. The lubricant passes through the bearings and drains back into the reservoir. Thus the gears and the bearings are kept constantly and generously lubricated.

The lubricant in the casing 1 will tend to follow along the shaft 2 and particularly through the way 44, and to prevent an over accumulation of lubricant about the friction clutch means is provided to return this lubricant to the reservoir. As shown more particularly in Fig. 2 the friction clutch is located in a cavity 66 formed in the hub of the pulley 4 and an end cap 67 is provided to close the cavity to protect the parts and to preclude the throwing of oil. Oil holes 68 formed in the hub of the pulley serve to drain the oil out of the cavity 66. An annular guard 69 non-rotatably supported by the bearing 300 coaxial with the hub of the pulley 4 receives the oil passing outwardly through the oil holes 68. A drain pipe 70 connects the lowermost portion of the guard with the casing 1 and serves to return the lubricant from the guard back to the reservoir.

From the foregoing it will be perceived that there has been provided an extremely simple and compact speed-box affording six speed changes; that the gear shifters have been so constructed and arranged as to permit all of them to be shifted by a single lever; that an interlock has been provided between the six-speed gear-shift lever and the clutch controlling lever; and that substantially all of the mechanism is arranged within the closed casing.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. A change-speed mechanism combining a drive shaft; a delivery shaft; a plurality of gears fixed to said delivery shaft; three independently shiftable gear-units splined to said drive shaft and adapted to be meshed with said fixed gears; a gear-shifter engaging each of said gear-units; two bars each having one end secured to one of said gear-shifters, said bars extending in opposite directions and overlapping each other adjacent an intermediate gear-shifter; rack-teeth formed on said overlapping portions; rack-teeth formed on the intermediate gear-shifter adjacent the teeth of said bars, said intermediate gear-shifter also having a portion underlying the free ends of said bars and forming a support therefor; a single gear-segment adapted selectively to be engaged with any one of said sets of rack-teeth and means to shift said segment to effect shifting of said gears.

2. A speed-change mechanism combining a driving shaft; a driven shaft; three independently shiftable gear-units splined to one of said shafts; a plurality of gears provided by each of said gear-units; a plurality of gears secured upon the other of said shafts and with which the gears of said gear-units are adapted to be meshed; a third shaft; three gear-shifters translatably and non-rotatably carried by said third shaft and each engaging one of said gear-units; a bar carried by each of two of said gear-shifters, said bars extending in opposite directions and overlapping each other adjacent the intermediate gear-shifter; rack-teeth formed on said overlapping portions; rack-teeth formed on the intermediate gear shifter adjacent the rack-teeth on one of said bars; a gear segment; and means to move said gear-segment first in one direction to cause it to engage any one of said racks and then in a direction transverse to its first movement to cause it to shift the engaged rack.

3. A speed-box for machine-tools combining a casing; driving and driven shafts journaled in said casing; a plurality of gears fixed upon one of said shafts; a plurality of gears splined upon the other of said shafts; means including a single lever for selectively shifting the splined gears into mesh with said fixed gears; a lever-controlling plate having a plurality of connected substantially parallel slots each affording an operative position for said lever; and adjustable stops for limiting the movement of said lever in said slots.

4. A speed-box for machine-tools combining a casing; driving and driven shafts journaled in said casing; speed-change gears carried by said shafts and adapted selectively to be meshed; a lubricant reservoir formed in said casing; a prime-mover loosely journaled coaxial with said driving shaft; clutch mechanism located within a cavity in said prime-mover and serving to establish a driving connection between said prime-mover and said driving shaft; and a lubricant drain from said cavity to said reservoir.

In witness whereof, I have hereunto subscribed my name.

DAVID C. KLAUSMEYER.